(12) United States Patent
Choi et al.

(10) Patent No.: US 11,929,500 B2
(45) Date of Patent: Mar. 12, 2024

(54) ELECTRODE ASSEMBLY

(71) Applicant: LG CHEM, LTD., Seoul (KR)

(72) Inventors: Ji Hyun Choi, Daejeon (KR); Han Young Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 757 days.

(21) Appl. No.: 17/048,917

(22) PCT Filed: Jan. 6, 2020

(86) PCT No.: PCT/KR2020/000164
§ 371 (c)(1),
(2) Date: Oct. 19, 2020

(87) PCT Pub. No.: WO2020/171375
PCT Pub. Date: Aug. 27, 2020

(65) Prior Publication Data
US 2021/0159497 A1  May 27, 2021

(30) Foreign Application Priority Data
Feb. 21, 2019 (KR) .................. 10-2019-0020424

(51) Int. Cl.
*H01M 4/525* (2010.01)
*H01M 4/02* (2006.01)
(Continued)

(52) U.S. Cl.
CPC .......... *H01M 4/525* (2013.01); *H01M 4/131* (2013.01); *H01M 4/505* (2013.01); *H01M 2004/027* (2013.01); *H01M 2004/028* (2013.01)

(58) Field of Classification Search
CPC ...... H01M 4/525; H01M 4/131; H01M 4/505; H01M 2004/027; H01M 2004/028;
(Continued)

(56) References Cited

U.S. PATENT DOCUMENTS

2008/0153004 A1    6/2008   Kim et al.
2009/0311538 A1   12/2009   Lim et al.
(Continued)

FOREIGN PATENT DOCUMENTS

CN    108475811 A    8/2018
CN    101202335 A    1/2024
(Continued)

OTHER PUBLICATIONS

International Search Report (PCT/ISA/210) issued in PCT/KR2020/000164, dated Apr. 21, 2020.
(Continued)

*Primary Examiner* — Daniel S Gatewood
(74) *Attorney, Agent, or Firm* — Birch, Stewart, Kolasch & Birch, LLP

(57) ABSTRACT

An electrode assembly, in which a positive electrode, a separator, and a negative electrode are repeatedly stacked includes a shrinkage film made of a material having a thermal shrinkage rate greater than that of the separator, the shrinkage film being shrunk in area at a specific temperature or more, wherein the shrinkage film is disposed instead of the separator at one or more positions between the positive electrode and the negative electrode so that, when the shrinkage film is shrunk by an increase of a temperature, the positive electrode and the negative electrode, which are adjacent to each other with the shrinkage film therebetween, partially contact each other to generate microcurrent.

10 Claims, 6 Drawing Sheets

(51) Int. Cl.
*H01M 4/131* (2010.01)
*H01M 4/505* (2010.01)

(58) Field of Classification Search
CPC ............ H01M 50/581; H01M 50/489; H01M 2300/0068; H01M 10/0585; H01M 10/42; H01M 10/052; H01M 10/4235; Y02E 60/10; Y02P 70/50
See application file for complete search history.

(56) References Cited

U.S. PATENT DOCUMENTS

| | | |
|---|---|---|
| 2011/0052987 A1 | 3/2011 | Katayama et al. |
| 2011/0236755 A1 | 9/2011 | Ogino et al. |
| 2016/0372780 A1 | 12/2016 | Sohn et al. |
| 2017/0047569 A1 | 2/2017 | Saka et al. |
| 2017/0338458 A1 | 11/2017 | Suguro et al. |
| 2018/0287184 A1 | 10/2018 | Lee et al. |
| 2019/0006635 A1 | 1/2019 | Kim et al. |

FOREIGN PATENT DOCUMENTS

| | | | |
|---|---|---|---|
| EP | 2 133 941 A1 | | 12/2009 |
| EP | 3 249 734 A1 | | 11/2017 |
| JP | 6-36774 A | | 2/1994 |
| JP | 2010-153043 A | | 7/2010 |
| JP | 2016-25093 A | | 2/2016 |
| JP | 2016-76359 A | | 5/2016 |
| JP | 2016076359 A | * | 5/2016 |
| KR | 10-2005-0066652 A | | 6/2005 |
| KR | 10-2006-0042845 A | | 5/2006 |
| KR | 20060042845 A | * | 5/2006 |
| KR | 10-2011-0108276 A | | 10/2011 |
| KR | 10-2016-0139192 A | | 12/2016 |
| KR | 10-2016-0149509 A | | 12/2016 |
| KR | 10-2017-0082279 A | | 7/2017 |
| KR | 10-2017-0139302 A | | 12/2017 |
| KR | 10-2018-0018050 A | | 2/2018 |
| KR | 10-2016-0109227 A | | 9/2018 |
| WO | WO 2015/159145 A1 | | 10/2015 |

OTHER PUBLICATIONS

Extended European Search Report for European Application No. 20759033.2, dated Aug. 3, 2021.

* cited by examiner

ELECTRODE ASSEMBLY

CROSS-REFERENCE TO RELATED APPLICATION

The present application claims the benefit of the priority of Korean Patent Application No. 10-2019-0020424, filed on Feb. 21, 2019, which is hereby incorporated by reference in its entirety.

TECHNICAL FIELD

The present invention relates to an electrode assembly in which a negative electrode, a separator, and a positive electrode are repeatedly stacked, and more particularly, to an electrode assembly that is capable of preventing ignition due to thermal runaway from occurring.

BACKGROUND ART

Batteries storing electrical energy may be generally classified into primary batteries and a secondary batteries. Such a primary battery is a disposable consumable battery. On the other hand, such a secondary battery is a chargeable battery that is manufactured by using a material in which oxidation and reduction processes between current and the material are capable of being repeated. That is, when the reduction reaction to the material is performed by the current, power is charged, and when the oxidation reaction to the material is performed by the current, power is discharged Here, such the charging-discharging are repeatedly performed.

Among various types of secondary batteries, lithium secondary batteries are generally manufactured by mounting an electrode assembly, in which a positive electrode (cathode), a separator, and a negative electrode (anode) are stacked, in a case. Here, as a process, in which lithium ions are intercalated and deintercalated from lithium metal oxide to the negative electrode, is repeated to charge and discharge the lithium secondary batteries.

The electrode assembly may be manufactured so that a positive electrode, 1, a separator 3, and a negative electrode 2 are stacked repeatedly. The electrode assembly is accommodated in a can such as a cylindrical can or a prismatic case. As illustrated in FIG. 1a, in which a side view of the electrode assembly is illustrated, the positive electrode 1 of the electrode assembly is coated with a positive electrode active material 1b on both surfaces of a positive electrode collector 1a, and the negative electrode 2 is coated with a negative electrode active material 2b on both surfaces of the negative electrode collector 2a. Here, a negative electrode tab (not shown) and a positive electrode tab (not shown) (which are expanded in a state in which the active materials are not applied) protrude from the negative electrode collector 2a and the positive electrode collector 1a in the negative electrode 2 and the positive electrode 1 so that current flows through the negative electrode tab and the positive electrode tab, respectively.

As demands for secondary batteries increase in fields such as energy storage system (ESS) and electric vehicles, research and development are being conducted to increase in capacity to volume of secondary batteries.

As a result, a secondary battery using an NCM (nickel (Ni), cobalt (Co), and manganese (Mn))-based positive electrode active material is being developed. However, the NCM-based secondary battery has a problem that, when a nickel content relatively increases, the capacity increases, but the thermal stability decreases, and thus, the possibility of ignition also increases.

FIG. 1b is a graph illustrating a change in temperature and pressure depending on a time when thermal runaway occurs in an electrode assembly according to the related art. In this experiment, a positive electrode stacked in the electrode assembly is coated with a positive electrode active material having a composition ratio of 8:1:1 of nickel, cobalt, and manganese, and experimental conditions are provided to measure a change in temperature and voltage (vertical axis) to a time (horizontal axis) when heat is applied at a constant rate.

As shown in the graph, when heat is applied at a specific temperature (approximately 150° C. in the graph) or more, it is confirmed that thermal runaway occurs in the electrode assembly to cause ignition (at a point at which a voltage is 0: 100 minutes). That is, the ignition occurs at a point corresponding to about 100 minutes in the graph. As a result, a voltage drops to 0 V, and a temperature instantaneously rises to 900° C. or more.

Also, it is known that use of a positive electrode active material having a relatively high content of nickel tends to be ignited at a lower temperature (as a content of nickel increases, thermal stability is deteriorated).

DISCLOSURE OF THE INVENTION

Technical Problem

Therefore, a main object of the present invention is to provide an electrode assembly that is capable of prevent ignition due to thermal runaway from occurring even if a positive electrode active material having a high nickel content (for example, an NCM811 active material) is used.

Technical Solution

An electrode assembly comprising a positive electrode, a separator, and a negative electrode repeatedly stacked, a shrinkage film made of a material having a thermal shrinkage rate greater than a thermal shrinkage rate of the separator, the shrinkage film being shrunk in area at a specific temperature or more, wherein the shrinkage film is disposed instead of the separator at one or more positions between the positive electrode and the negative electrode so that, when the shrinkage film is shrunk by an increase of a temperature, the positive electrode and the negative electrode, which are adjacent to each other with the shrinkage film therebetween, partially contact each other to generate microcurrent. The flow of the microcurrent may reduce a state of charge (charging amount: SOC) of the electrode assembly to improve stability.

The shrinkage film may be manufactured to be restored to its original area when the temperature drops down below the specific temperature. On the other hand, the shrinkage film may be manufactured so as not to be restored even if the temperature drops down below the specific temperature. This may be determined according to a design of the electrode assembly. When the shrinkage film is restored to its original area as the temperature drops down after shrinkage (when being wider than the shrunk area even if not the original area), the flow of the microcurrent may be interrupted or minimized to allow the electrode assembly to be in a stable state and prevent short circuit due to a flow of large current by external factors from occurring.

The shrinkage film according to the present invention may be manufactured to contain a material that is shrunk from a crystal structure. For example, the material in which the shrinkage occurs may be zirconium tungstate ($ZrW_2O_8$).

In the positive electrode, an NCM positive electrode active material, which contains nickel, cobalt, and manganese, may be applied on a surface of a positive electrode collector. The NCM positive electrode active material may have a weight ratio of nickel greater than a weight ratio of each of cobalt and manganese. For example, the NCM positive electrode active material may be NCM811 having a content (composition ratio) of nickel, cobalt, and manganese of 8:1:1 or NCM622 having a composition ratio of 6:2:2.

Also, an outermost layer may be a single-sided positive electrode coated with a positive electrode active material on only one surface of a positive electrode collector, and the shrinkage film may be stacked to contact the single-sided positive electrode. Here, the single-sided positive electrode may be stacked so that the positive electrode collector faces outward, and the positive electrode active material faces the shrinkage film.

Here, the shrinkage film may be stacked at only a position contacting the single-sided positive electrode and may be stacked at one or more positions between a double-sided positive electrode coated with the positive electrode active material on both surfaces of the positive electrode collector and a double-sided negative electrode coated with a negative electrode active material on both surfaces of a negative electrode collector in addition to the position contacting the single-sided positive electrode.

Alternatively, the shrinkage film may not be stacked at the outermost side, wherein the shrinkage film may be stacked at one or more positions between the double-sided positive electrode coated with the positive electrode active material on both the surfaces of the positive electrode collector and the double-sided negative electrode coated with the negative electrode active material on both the surfaces of the negative electrode collector.

Therefore, in the present invention, the electrode assembly as described above may additionally provide a secondary battery embedded in the case.

Advantageous Effects

According to the present invention having the above technical features, when the high-temperature heat is generated due to the thermal runaway of the positive electrode material or the external factors, the flow of the microcurrent may be allowed to reduce the charging rate of the electrode assembly, thereby improving the thermal stability (reducing the possibility of the ignition).

Since the shrinkage film according to the present invention contains the material that causes the shrinkage from the crystal structure, the shrinkage may uniformly occur as a whole.

According to the present invention, a single-sided positive electrode on which a positive electrode active material is applied to only one surface of a positive electrode collector may be disposed at the outermost layer to prevent lithium from being precipitated.

MODE FOR CARRYING OUT THE INVENTION

Figure 1A:
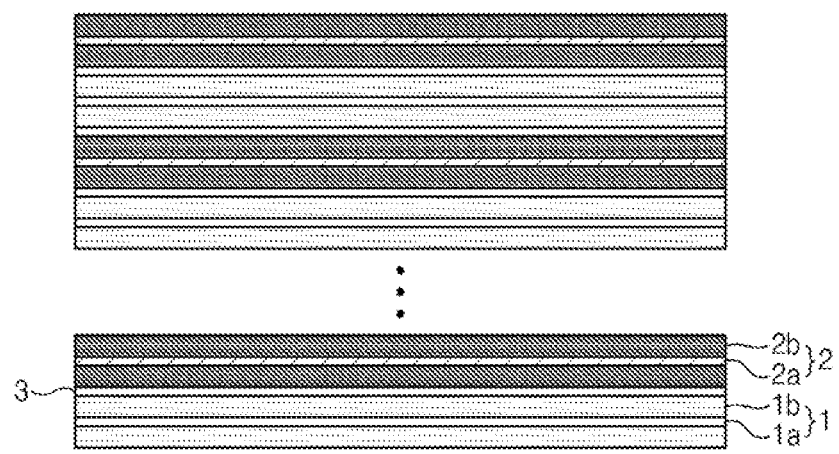
FIG. 1a is side view of an electrode assembly in which a positive electrode, a separator, and a negative electrode are repeatedly stacked according to a related art.
Figure 1B:
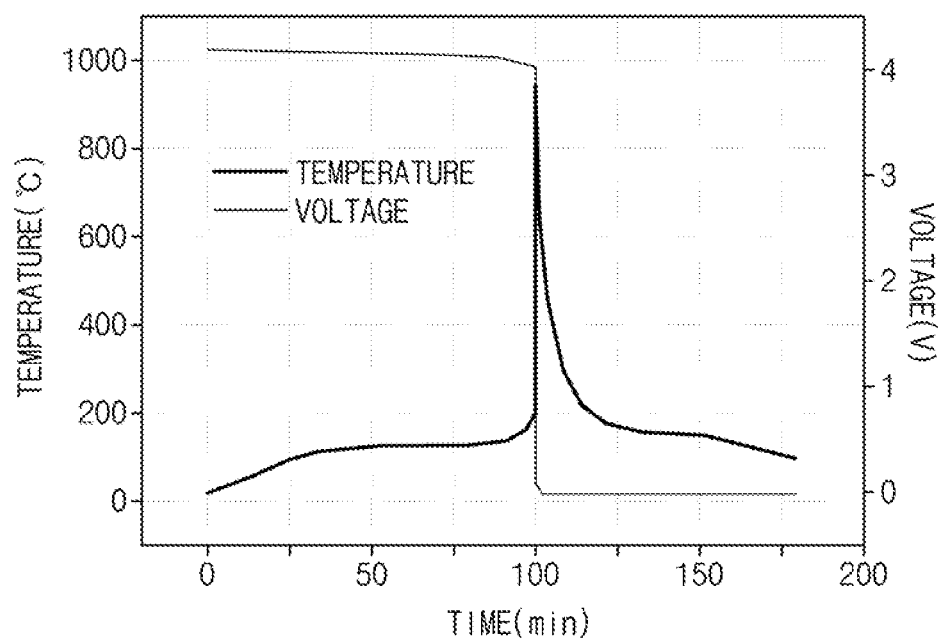
FIG. 1b is a graph illustrating a change in temperature and pressure depending on a time when thermal runaway occurs in the electrode assembly according to the related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an electrode assembly in which a positive electrode, a separator, and a negative electrode are repeatedly stacked and has a feature in which ignition due to thermal runaway is suppressed by using a shrinkage film that is shrunk in area when heat is applied. Hereinafter, embodiments according to the present invention will be described in more detail with reference to the accompanying drawings.

First Embodiment

As described above, an electrode assembly according to the present invention comprises a shrinkage film 31 that is shrunk in area at a specific temperature or more. In this embodiment, the shrinkage film 31 is disposed instead of the separator 30 at each of the uppermost side and the lowermost side among positions at which the separators 30 are disposed.

Figure 2:
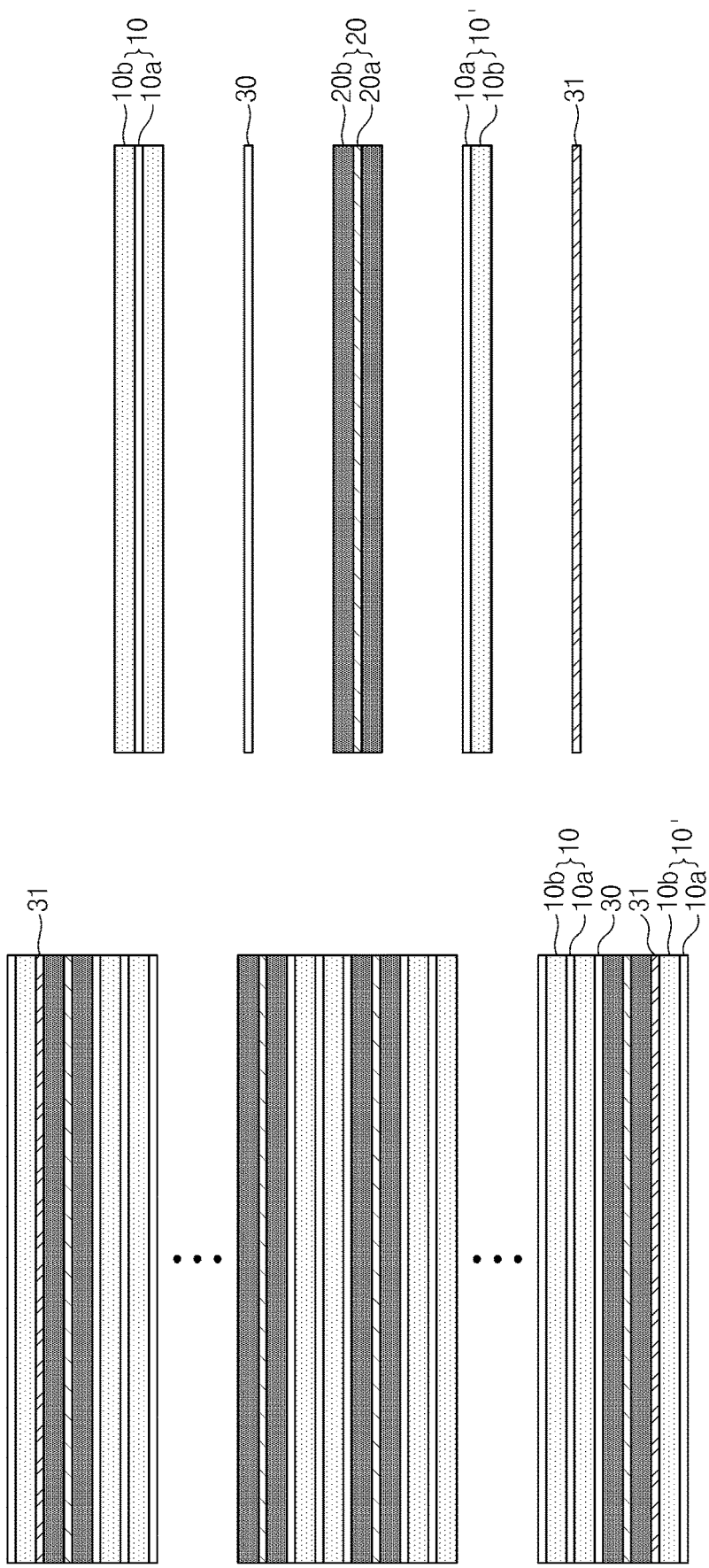
FIG. 2 is a side surface of an electrode assembly in which a positive electrode, a separator, and a negative electrode are repeatedly stacked, i.e., a shrinkage film is stacked instead of a separator at one or more positions of positions at which the separators are stacked.

As illustrated in FIG. 2, which illustrates a side view of the electrode assembly in which the shrinkage film 31 is disposed instead of the separator 30 at each of the uppermost and lowermost sides among the positions at which the separators 30 are disposed, according to the present invention, the shrinkage film 31 is stacked instead of the separator 30 at at least one or more positions between the positive electrode 10 and the negative electrode 20, and also, the shrinkage film 31 is disposed at stacking positions of the separators disposed at the outermost sides.

The shrinkage film 31 may be configured to separate the positive electrode 10 and the negative electrode 10 from each other in a normal temperature range as long as the shrinkage film 31 has a sufficient thermal shrinkage rate and also allow lithium ions to be conducted, like the separator 30. However, unlike the separator 30, the shrinkage film 31 may block the conduction of the lithium ions. Also, the shrinkage film 31 is manufactured to contain a material that is shrinkable from a crystal structure and thus is shrunk in area when heat is applied at a specific temperature or more.

However, since the separator 30 has a structure in in which a coating layer is applied to a surface of a polymer base material, the separator 30 may have thermal shrinkage according to a molecular bonding structure of the polymer base material and/or the coating layer. However, the thermal shrinkage rate of the separator 30 is considered to be low enough to not allow contact between the negative electrode and the positive electrode. Thus, in this specification, the separator 30 does not allow contact between the negative electrode and the positive electrode. On the other hand, the shrinkage film 31 allows contact between the negative electrode and the positive electrode when heat is applied at a specific temperature or more.

Figure 3:
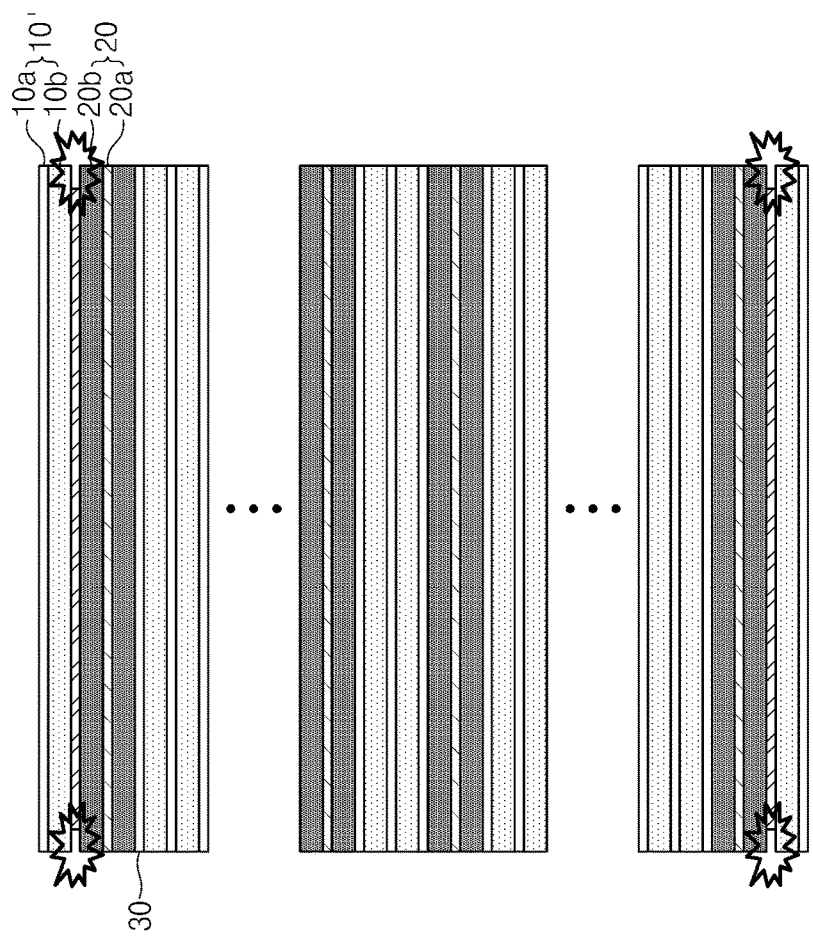
FIG. 3 is a view illustrating a state (left view) before the positive electrode and the negative electrode contact each other and a state (right view) after the positive electrode and the negative electrode contact each other when the shrinkage film is shrunk in the electrode assembly of FIG. 2.
Figure 3:
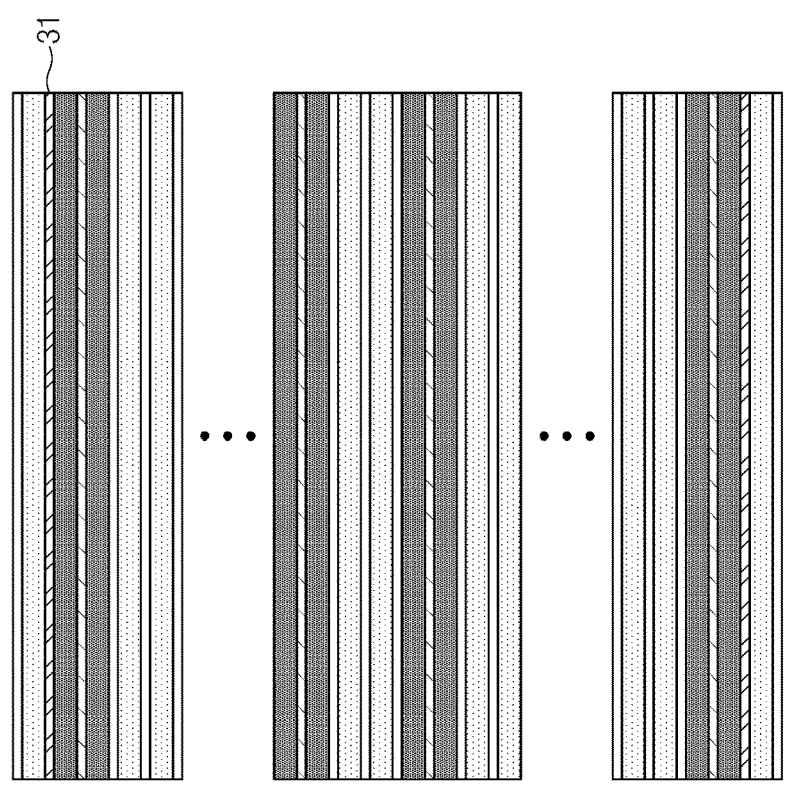

Accordingly, when the thermal runaway phenomenon starts at the positive electrode 10, and thus, a temperature starts to rise, the shrinkage film 31 is shrunk. Therefore, as illustrated in FIG. 3, which illustrates states before and after the positive electrode 10 and the negative electrode 20 contact each other, when the shrinkage film 31 is shrunk, the positive electrode 10 and the negative electrode 20, which are adjacent to each other with the shrinkage film 31 therebetween, partially contact each other. For reference, although a positive electrode active material 10a of the positive electrode 10 and a negative electrode active material 20a of the negative electrode 20, which contact each other, are illustrated in the drawings, the present invention is not limited thereto. In practice, the positive electrode collector 10a and the negative electrode collector 20a may contact active materials 10b and 20b, which have opposite polarities, at positions at which the electrode tans (not shown) that are not coated with the active materials 10b and 20b are formed.

Here, since an area on which the negative electrode 20 and the positive electrode 10 contact each other by the shrinkage of the shrinkage film 31 is very small when compared to the total area of the negative electrode 20 and the positive electrode 10, microcurrent flows through the contact portion (the microcurrent means current flowing through a small area relative to the area of the electrode, but does not mean current having an absolutely small value. Thus, the meaning of the microcurrent is clear as it means relatively soft short current).

Since the microcurrent flows, a state of charge (SOC) of the entire electrode assembly is gradually lowered, and the thermal runaway due to overcharging or external factors may be relaxed before the ignition.

In this embodiment, a material in which the shrinkage occurs from the crystal structure may be zirconium tungstate ($ZrW_2O_8$). The zirconium tungstate has atoms attracted with respect to each other to reduce the overall size when the temperature increases because a natural vibration frequency generated inside the material is very low, and also, it is known that research and development are in progress for use in various fields.

The shrinkage film 31 containing the zirconium tungstate having the above-described features may be restored to its original area when the thermal runaway is relaxed to drop down to the specific temperature or less according to a content of the zirconium tungstate and the manufacturing method of the shrinkage film 31 or may be manufactured to be maintained in the shrunk state. This may be determined according to a design of the electrode assembly.

For reference, the shrinkage film 31 has to be manufactured to be limited in maximum amount of shrinkage and shrinkage range so as to prevent a short circuit in which large current flows from occurring. Also, the shrinkage film 31 may have no problem in terms of lowering possibility of the ignition even if its original area is not restored after the temperature decreases (since the charging amount is continuously reduced). However, as the temperature decreases after the shrinkage, when the original area is restored as the temperature decreases, or when being wider than the shrunk area even if not the original area, the flow of the microcurrent may be interrupted to more reduce the possibility of the short circuit in which the large current flows.

In this embodiment, the positive electrode 10 is coated with an NCM positive electrode active material 10b containing nickel, cobalt, and manganese on the surface of the positive electrode collector 10a. The NCM positive electrode active material 10b has a weight ratio of nickel greater than that of each of cobalt and manganese. For example, the NCM positive electrode active material may be NCM811 having a content (composition ratio) of nickel, cobalt, and manganese of 8:1:1 or NCM622 having a composition ratio of 6:2:2.

Also, as illustrated in FIGS. 2 and 3, according to the present invention, a single-sided positive electrode 10' on which the positive electrode active material 10b is applied to only one surface of the positive electrode collector 10a at the outermost layer exposed to the outside. Also, the shrinkage film 31 is stacked to contact the single-sided positive electrode 10' disposed at the outermost layer. Here, the single-sided positive electrode 10' disposed at the outermost layer is stacked so that the positive electrode collector 10a faces outward, and the positive electrode active material 10b faces the shrinkage film 31.

As described above, the reason in which the single-sided positive electrode 10' is disposed at the outermost layer is because, if the double-sided positive electrode 10 is disposed at the outermost layer, possibility of lithium precipitation occurs between an inner wall of a case, in which the electrode assembly is embedded, and the positive electrode active material disposed at the outermost layer (i.e., when the double-sided positive electrode is disposed at the outermost side, lithium ions deintercalated from the positive electrode active material disposed at the outermost side are not received in the negative electrode but is precipitated).

Second Embodiment

As described in the first embodiment of the present invention, the shrinkage film 31 may be stacked at only the position contacting the single-sided positive electrode 10' and also may be stacked at one or more positions between the double-sided positive electrode 10 coated with the positive electrode active material 10b on both the surfaces of the positive electrode collector 10a and the double-sided negative electrode 20 coated with the negative electrode active material 20b on both the surfaces of the negative electrode collector 20a in addition to the position contacting the single-sided positive electrode 10'. Alternatively, the shrinkage film 31 may be stacked only between the double-sided positive electrode 10 and the double-sided negative electrode 20 except for the position contacting the single-sided positive electrode 10'.

Figure 4:
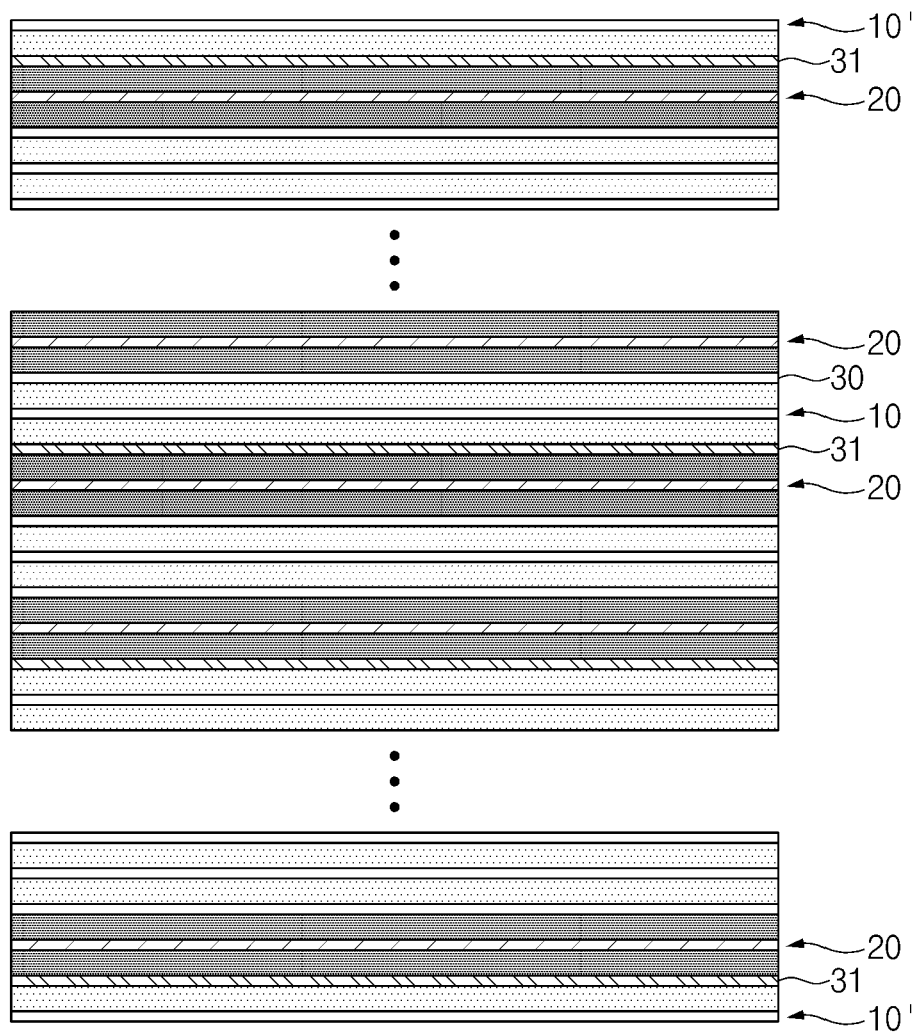
FIG. 4 is a side view illustrating a state in which a shrinkage film is additionally stacked in addition to a position that contacts the outermost positive electrode according to a second embodiment of the present invention.

Referring to FIG. 4, which illustrates a state in which a shrinkage film 31 is additionally stacked in addition to the position contacting the outermost single-sided positive electrode 10' according to a second embodiment, the shrinkage film 31 may be additionally disposed between a double-sided positive electrode 10 and a double-sided negative electrode 20 in addition to the position contacting the single-sided positive electrode 10'.

In an electrode assembly in which a positive electrode 10, a separator 30, and a negative electrode 20 are repeatedly stacked, it is difficult, to dissipate heat at an inner side (an intermediate layer) that an outer side that is close to the outside, and thus, the inner side has a higher temperature. Thus, in order to more quickly shrink the shrinkage film 31, the shrinkage film 31 may be additionally disposed or selectively disposed at the intermediate layer of the electrode assembly, at which a larger amount of heat is generated.

That is, in this embodiment, the stacked position and the number of stacking of the shrinkage film 31 may be adjusted to tune a time point at which reduction of a charging amount by microcurrent starts.

Figure 5:
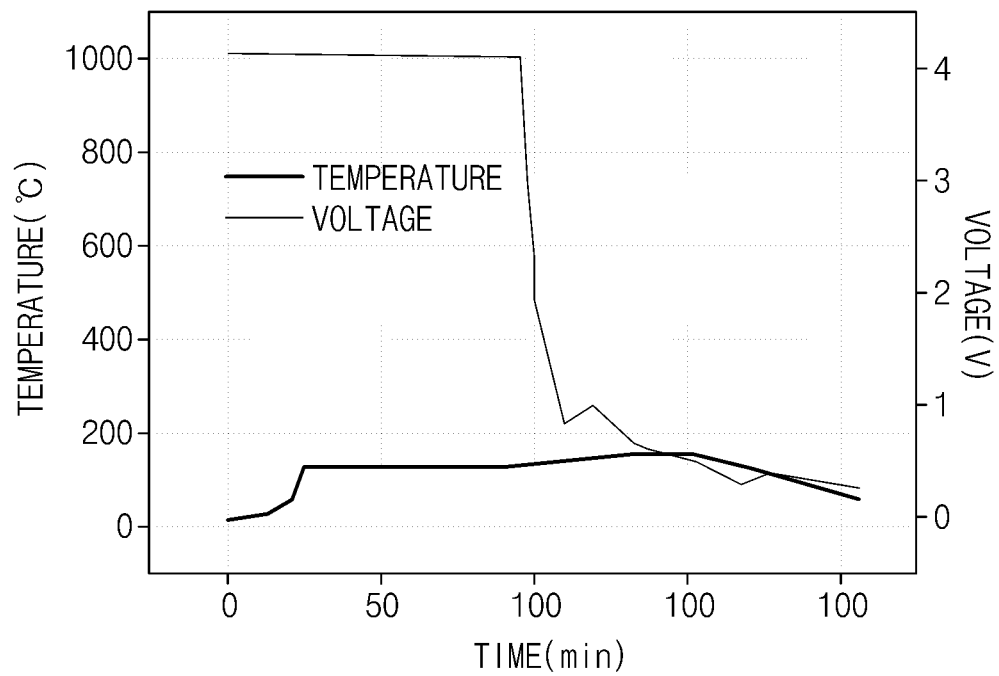
FIG. 5 is a graph illustrating a state in which a temperature drops down before thermal runaway proceeds in the electrode assembly, i.e., a change in temperature and voltage depending on a time according to the present invention.

As illustrated in FIG. 5, which illustrates a graph showing a change in temperature and voltage depending on a time as a state in which a temperature drops down before thermal runaway proceeds in the electrode assembly, in the electrode assembly according to the present invention, the thermal runaway may proceed to rise a temperature, a flow of the microcurrent occurs by the shrinkage of the shrinkage film 31 (at a point at which the voltage sharply decreases in the vicinity of a point corresponding to 90 minutes) to reduce the charging amount, thereby preventing the ignition from occurring.

Furthermore, in the present invention, the electrode assembly as described above may additionally provide a secondary battery embedded in the case.

According to the present invention having the above technical features, when the high-temperature heat is generated due to the thermal runaway of the positive electrode 10 or the external factors, the flow of the fine current may be allowed to reduce the charging rate of the electrode assembly, thereby reducing the possibility of the ignition.

Since the shrinkage film 31 according to the present invention contains the material that causes the shrinkage from the crystal structure, the shrinkage may uniformly occur as a whole.

According to the present invention, the single-sided positive electrode 10' on which a positive electrode active material is applied to only one surface of a positive electrode collector may be disposed at the outermost layer to prevent lithium from being precipitated.

While the embodiments of the present invention have been described with reference to the specific embodiments, it will be apparent to those skilled in the art that various changes and modifications may be made without departing from the spirit and scope of the invention as defined in the following claims.

The invention claimed is:

1. An electrode assembly, the electrode assembly comprising:
a plurality of positive electrodes, a plurality of negative electrodes and a plurality of separators repeatedly stacked,
wherein one of the plurality of separators is a shrinkage film made of a material shrinking at greater than a predetermined temperature,
wherein the shrinkage film is disposed between a first positive electrode of the plurality of positive electrodes and a first negative electrode of the plurality of negative electrodes so that, when the shrinkage film is shrunk by an increase of a temperature, the first positive electrode and the first negative electrode contact each other to generate a microcurrent, and
wherein the first positive electrode has a positive current collector with a positive electrode active material facing the shrinkage film.

2. The electrode assembly of claim 1, wherein the shrinkage film contains a material that is shrunk from a crystal structure.

3. The electrode assembly of claim 2, wherein the material shrunk from the crystal structure comprises zirconium tungstate ($ZrW_2O_8$).

4. The electrode assembly of claim 1, wherein the positive electrode active material is an NCM positive electrode active material, which contains nickel, cobalt, and manganese, is applied on a surface of a positive electrode collector.

5. The electrode assembly of claim 4, wherein the NCM positive electrode active material has a weight ratio of nickel greater than a weight ratio of each of cobalt and manganese.

6. The electrode assembly of claim 1, wherein the first positive electrode is an outermost layer coated with the positive electrode active material on only one surface of the positive electrode collector,
wherein the shrinkage film is stacked to contact the outermost layer.

7. The electrode assembly of claim 6, wherein the shrinkage film is stacked at only a position contacting the single-sided positive electrode.

8. The electrode assembly of claim 1, wherein the first positive electrode is a double-sided positive electrode coated with the positive electrode active material on both surfaces of the positive electrode collector and a double-sided negative electrode coated with a negative electrode active material on both surfaces of a negative electrode collector.

9. The electrode assembly of claim 1, wherein the shrinkage film is restored to an original area when the temperature drops down below the predetermined temperature.

10. A secondary battery in which the electrode assembly of claim 1 is embedded in a case.

* * * * *